United States Patent
Eckardt et al.

(10) Patent No.: US 8,670,517 B2
(45) Date of Patent: Mar. 11, 2014

(54) NUCLEAR TECHNOLOGY PLANT AND METHOD FOR THE PRESSURE RELIEF OF A NUCLEAR TECHNOLOGY PLANT

(75) Inventors: Bernd Eckardt, Bruchköbel (DE); Robert Feuerbach, Kriftel (DE)

(73) Assignee: Areva GmbH, Erlangen (DE)

( * ) Notice: Subject to any disclaimer, the term of this patent is extended or adjusted under 35 U.S.C. 154(b) by 1222 days.

(21) Appl. No.: 11/318,899

(22) Filed: Dec. 27, 2005

(65) Prior Publication Data
US 2014/0003568 A1    Jan. 2, 2014

Related U.S. Application Data

(63) Continuation of application No. PCT/EP2004/006946, filed on Jun. 25, 2004.

(30) Foreign Application Priority Data

Jun. 25, 2003   (DE) .................................. 103 28 774

(51) Int. Cl.
*G21C 9/00* (2006.01)
*G21C 9/04* (2006.01)

(52) U.S. Cl.
USPC .............................. 376/283; 376/309; 376/313

(58) Field of Classification Search
None
See application file for complete search history.

(56) References Cited

U.S. PATENT DOCUMENTS

| | | | |
|---|---|---|---|
| 3,800,511 A * | 4/1974 | Hull ................................. | 96/236 |
| 3,853,502 A * | 12/1974 | Dorr et al. ........................ | 95/198 |
| 3,914,815 A * | 10/1975 | Kobayashi ........................ | 15/3.5 |
| 4,272,499 A * | 6/1981 | Cason et al. ............. | 423/243.08 |
| 4,469,493 A * | 9/1984 | Tuovinen et al. ................ | 95/201 |
| 4,863,677 A | 9/1989 | Eckardt | |
| 4,873,050 A | 10/1989 | Eckardt | |
| 4,931,263 A * | 6/1990 | Wakui et al. ................ | 423/215.5 |

(Continued)

FOREIGN PATENT DOCUMENTS

| | | |
|---|---|---|
| DE | 36 37 795 A1 | 5/1988 |
| DE | 38 15 850 A1 | 11/1989 |

(Continued)

OTHER PUBLICATIONS

Chapman et al, "Mathematical Theory of Non-Uniform Gases", Cambridge University Press, Third Edition, Cambridge (UK) (1970), p. 36.*

(Continued)

*Primary Examiner* — Johannes P Mondt
(74) *Attorney, Agent, or Firm* — Laurence A. Greenberg; Werner H. Stemer; Ralph E. Locher

(57) ABSTRACT

A nuclear plant has a containment shell and a pressure relief pipe connected thereto in which a blowing device and a Venturi washer placed in a container with a washing liquid are connected in series. Even the finest particles or aerosols carried by air are held in the Venturi washer with a very high degree of reliability and the release thereof in environment is excluded in a particularly reliable manner in the case of decompression even associated with seal failures. For this purpose, the size of the blowing device and the Venturi washer are selected in such a way that during the operation of the blowing device a flow rate of liquid in the Venturi washer flowing to the decompressing pipe is higher than 130 m/sec, preferably higher than 180 m/sec.

29 Claims, 2 Drawing Sheets

(56) References Cited

U.S. PATENT DOCUMENTS

| | | | |
|---|---|---|---|
| 4,936,878 A * | 6/1990 | Gustavsson et al. | 95/216 |
| 5,017,331 A | 5/1991 | Eckardt | |
| 5,043,158 A * | 8/1991 | Sleytr et al. | 424/197.11 |
| 5,227,127 A | 7/1993 | Sato | |
| 5,267,283 A | 11/1993 | Berg et al. | |
| 5,353,949 A * | 10/1994 | Seibert et al. | 220/371 |
| 5,473,647 A * | 12/1995 | Eckardt | 376/308 |
| 5,872,825 A | 2/1999 | Eckardt | |
| 6,280,502 B1 | 8/2001 | van Veen et al. | |
| 6,513,345 B1 | 2/2003 | Betting et al. | |

FOREIGN PATENT DOCUMENTS

| | | | |
|---|---|---|---|
| DE | 41 41 496 A1 | 7/1992 | |
| DE | 195 32 366 C1 | 12/1996 | |
| EP | 0 285 845 | 10/1988 | |
| EP | 0 507 155 A1 | 10/1992 | |
| SU | 1 768 242 A1 | 10/1992 | |
| WO | WO 90/16071 | * 12/1990 | G21C 9/00 |

OTHER PUBLICATIONS

From on-line Academic Press Dictionary of Science and Technology, XREFERPLUS, meanings of "throttle" and "choke". See http://www.xreferplus.com.*

Chapman et al., "The Mathematical Theory of Non-Uniform Gases", Cambridge University Press, Great Britain, Third Edition (1970), section 2.5, "Gas-mixtures", p. 44.*

Landau et al., Fluid Mechanics—Course of Theoretical Physics, vol. 6, Pergamon Press, Oxford, Great Britain (1959) (reprinted 1979), pp. 20-21.*

* cited by examiner

NUCLEAR TECHNOLOGY PLANT AND METHOD FOR THE PRESSURE RELIEF OF A NUCLEAR TECHNOLOGY PLANT

CROSS-REFERENCE TO RELATED APPLICATION

This is a continuation, under 35 U.S.C. §120, of copending international application PCT/EP 2004/006946, filed Jun. 25, 2004, which designated the United States; this application also claims the priority, under 35 U.S.C. §119, of German patent application No. 103 28 774.4, filed Jun. 25, 2003; the prior applications are herewith incorporated by reference in their entirety.

BACKGROUND OF THE INVENTION

Field of the Invention

The invention lies in the field of nuclear engineering. More specifically, the invention relates to a nuclear technology plant having a containment to which a pressure relief line is connected. It also relates to a method for the pressure relief of such a plant.

In a nuclear power station, in case of incident or accident situations, depending on the incident in question and countermeasures instigated where appropriate, for example inerting the containment atmosphere, account must be taken of a possibly significant pressure increase inside the containment. In order to avoid structural damage possibly resulting from this to the containment per se, or system components arranged in it, nuclear power stations may be designed for contingent pressure relief of the containment by releasing the containment atmosphere (venting). To this end, a pressure relief line is conventionally connected to the containment of a nuclear technology plant. Such containments conventionally have low leakage rates of for example <0.1%/d, so that only very minor discharges to the environment take place via leaks, even in such accident situations. Other containments however, for example the Russian design of the type WWER 440, have significant sealing defects of for example 20-100 wt. % per day, so that the described positive pressure venting technique cannot be employed owing to the permanently unfiltered leaks.

The containment atmosphere usually contains radioactive material however, for example noble gases, iodine or aerosol, which could reach the environment of the nuclear power station in the case of venting. Particularly in case of comparatively serious incidents with core meltdown possibly occurring, airborne activity quantities (aerosols) inside the containment could occur in particularly high concentrations so that release of significant quantities of such aerosols or activity quantities into the environment of the nuclear technology plant could take place in the presence of large sealing defects or if unacceptable positive pressure situations arise. Such airborne activities could cause land contamination lasting a comparatively long time, in particular owing to the long half-lives of possibly entrained components such as iodine or cesium isotopes. In order to avoid this, the pressure relief systems intended for venting the containment atmosphere are conventionally provided with filtering or activity retention devices, which are intended to prevent airborne activity quantities entrained in the containment atmosphere from being released to the environment.

To this end, for example, European patent EP 0 285 845 B1 and U.S. Pat. No. 4,873,050 discloses a concept for the pressure relief of a nuclear power station, in which a venturi scrubber provided as a filter to retain airborne activities and a throttle device are connected in series into a pressure relief line connected to the containment of the nuclear power station. The venturi scrubber comprises a number of venturi tubes arranged in a scrubbing liquid held in a container, to which the gas stream conveyed in the pressure relief line can be applied.

The venturi tubes respectively comprise a constriction designed similarly as a nozzle, at which the gas stream flowing through is accelerated to a particularly high flow rate. Entry openings for the scrubbing liquid are provided in the region of this constriction, the scrubbing liquid which enters being carried along by the gas stream flowing through. Fragmentation of the scrubbing liquid takes place owing to the comparatively high flow rate of the gas stream at this point, airborne activities or aerosols entrained in the gas stream being incorporated into the liquid droplets resulting from this. By subsequent droplet separation from the gas stream, it is therefore possible to remove a large part of the entrained aerosols or airborne activities.

In the system described in EP 0 285 845 B1 and U.S. Pat. No. 4,873,050, the throttle device connected in series with the venturi scrubber is designed for operation with so-called critical expansion. The pressure conditions in the line system in the case of critical expansion, i.e. in particular the pressure drop across the throttle device, are set up so that the medium flowing in the line flows through the throttle device at the speed of sound. In case of intervention, i.e. in the event of pressure relief of the containment, this effect is used in the system according to EP 0 285 845 B1 and U.S. Pat. No. 4,873,050 in order to set up a volume throughput in the pressure relief line which is constant as a function of time. In nuclear technology plants whose containment has serious sealing defects owing to its design, however, significant airborne activities could enter the environment precisely in the event of comparatively long-lasting incident scenarios. In order to allow the safe continued operation of such plants, it is therefore desirable that the safety standard internationally required for nuclear technology plants should be complied with for such plants as well.

SUMMARY OF THE INVENTION

It is accordingly an object of the invention to provide a nuclear plant and a pressure relief method for a nuclear plant which overcomes the above-mentioned disadvantages of the heretofore-known devices and methods of this general type and in which even very fine airborne activities or aerosols can be retained with a particularly high reliability in the venturi scrubber in the event of pressure relief, even if there are design-related sealing defects of the containment, so that release to the environment is precluded with a particularly high reliability. It is also an object to provide a method for the pressure relief of such a nuclear technology plant.

With the foregoing and other objects in view there is provided, in accordance with the invention, a nuclear plant, comprising:
  a containment;
  a pressure relief line communicating with said containment;
  a blower device and a venturi scrubber connected in series in said pressure relief line, said venturi scrubber being disposed in a container with a scrubbing liquid;
  said blower device and said venturi scrubber being dimensioned to establish in said venturi scrubber, in an operating state of said blower device, a flow velocity of a medium conveyed in said pressure relief line of more than 130 m/s and preferably even more than 180 m/s.

In other words, the objects of the invention are achieved in that a blower device and a venturi scrubber, arranged in a container with a scrubbing liquid, are connected in series into the pressure relief line, the blower device and the venturi scrubber being dimensioned so that a flow rate of the medium conveyed in the pressure relief line of more than 130 m/s, preferably more than 180 m/s, is set up in the venturi scrubber in the operating state of the blower device.

The invention is based on the consideration that in order to separate airborne activities or aerosols in a venturi scrubber or a venturi tube by feeding water into the tube interior, a comparatively fine droplet mist is produced owing to the flow conditions prevailing there, the airborne activities or aerosols to be separated being incorporated into such droplets so that they can be removed with them from the gas stream. A particularly high separating effect can therefore be achieved, even for very fine aerosols, by keeping the probability particularly high that the aerosols will strike suitable water droplets and be incorporated into them. As has been surprisingly found, precisely with venturi tubes in which the scrubbing liquid can be fed into the tube interior in the manner of a passive design using the negative pressure prevailing at the constriction and therefore without external drive means, the striking and inclusion probability of even very fine aerosols in the droplet mist increases to a significant super-proportional degree, so that with very high flow rates of the gas stream in the venturi tube it is possible to achieve separation rates of more than 99.9% for mixed aerosols with a particle size of about 1 µm and of 98% or more for comparatively fine aerosols with a particle size of less than 0.5 µm in the scrubbing liquid. The pressure relief and activity retention system of the nuclear technology plant is therefore designed to sustain such high flow rates in case of pressure relief.

In order to ensure such a high separation rate in each phase of a possible incident precisely in view of the characteristic parameters, for example plant pressure, possibly changing to a large degree over the full course of the incident in the event of a serious incident scenario, and therefore to prevent release of contaminating components into the environment to the greatest possible degree in each phase of an incident, the pressure relief and activity retention system of the nuclear technology plant is furthermore designed for such a high separation factor almost independently of gas and vapor quantities produced in the containment of the nuclear technology plant. In order to ensure this, the flow conditions intended according to design are to be set up in the venturi scrubber by generating high pressures in an upstream high-performance blower.

The blower device used for this is preferably designed as a high-performance radial fan with a rated speed of more than 10,000 rpm and a pressure of at least 200 mbar, preferably more than 500 mbar.

The venturi scrubber preferably comprises a multiplicity of venturi tubes. They may designed as so-called short venturi tubes, the outlets of which are arranged below the intended setpoint level of the scrubbing liquid so that the venturi tubes are immersed essentially fully in the scrubbing liquid. Preferably, however, a comparatively large number of the venturi tubes are designed as so-called long venturi tubes, the outlets of which are arranged above the intended setpoint level of the scrubbing liquid. Gas deviation for centrifugal drop separation is preferably provided in this case.

By venturi nozzle tubes blowing out primarily above the scrubbing liquid, in particular because of the low gas density at atmospheric operation and the concomitant large volume flows, the water ejection determining the component size can be kept small and a particularly high idle tube speed can be set in the venturi scrubber device. The consequences are a significantly smaller venturi scrubber diameter and a smaller component height, as well as correspondingly reduced consumption of scrubbing liquid. Owing to the compact structure which this allows for the scrubber device, it is possible to design the high-pressure fan and scrubber as well as the fiber filter with a molecular sieve in merely two modules, for example in a so-called "skid-mounted" design, even with a very high extraction power of for example more than 10,000 $m^2/h$ to 30,000 $m^2/h$. This leads to a significant reduction of the production and assembly outlay, because the machine and control technology equipment of the completed device, including optimization, acceptance tests etc. can already be carried out in the factory. The freely programmable digital control and E-engineering used can likewise already be tested and optimized in the factory.

In order furthermore to prevent sedimentation in the region of the container, which could lead to increased servicing and maintenance requirements, the venturi scrubber in another preferred configuration is designed for comparatively intense turbulence and circulation of the scrubbing liquid in the operational case. To this end a small proportion of the venturi tubes, preferably up to about 10%, are arranged with an outlet direction directed downward inside the container and below the setpoint level of the scrubbing liquid.

It has been found particularly favorable for ensuring high separation rates to set a comparatively high water load in the venturi scrubber, for example more than 5 liters, preferably more than 10 liters, of scrubbing liquid per cubic meter of gas. This is because precisely the combination of such high water loads with the high flow rates intended according to design favor reliable separation to a particular degree. In order to ensure this, the venturi tubes in another preferred configuration have an annular slot feed with an aperture angle of from 20° to 85°, preferably from 30° to 45°, extending over the nozzle circumference. For such a high water load, the venturi tubes of the venturi scrubber furthermore preferably have respectively a ratio of their throat cross-sectional area to the entry area for the scrubbing liquid of less than 10:1, preferably about 3:1. The throat cross-sectional area in this case indicates the cross-sectional area through which the flow medium can flow freely at the constriction inside the respective venturi tube.

In a particularly preferred configuration, the venturi tubes of the venturi scrubber are designed so as to ensure passive scrubbing liquid intake and distribution, due to the negative pressure generated by the medium flowing through, as far as the core jet region in the interior of the venturi tube. To this end, the venturi tubes of the venturi scrubber are preferably designed as round or substantially round venturi tubes with a throat width of less than about 80 mm, preferably less than about 40 mm, or as flat or substantially flat venturi tubes with a throat width of less than about 100 mm. In addition or as an alternative, the venturi tubes of the venturi scrubber preferably have a height to throat width ratio of more than 20, preferably more than 50.

A particularly compact design for the pressure relief and activity retention system assigned to the nuclear, technology plant, with correspondingly reduced production and assembly outlay, can be achieved in that the container equipped with the venturi scrubber is connected to a further scrubbing liquid reservoir on the scrubbing liquid side. The amount of scrubbing liquid held in the container itself can therefore be kept comparatively small and in case of need, i.e. particularly when consumption of scrubbing liquid takes place, a contingent top up from the further scrubbing fluid store may be provided. The (in this sense) inactive, comparatively large scrubbing liquid reservoir may in this case be held in a separate storage container and used, in particular, to replace evaporated scrubbing liquid. The filling level in the container may be adjusted passively by arranging the further scrubbing liquid reservoir at the same geodetic height or with a filling level float control. Further water reservoirs which are in any case already provided, for example wastewater containers, deionate supply or the like, may in particular also be used as a further scrubbing liquid reservoir, in which case the contingent additional feed of scrubbing water into the container may take place via gradients or by means of diaphragm pumps.

Particularly effective activity retention can be achieved in that the pressure relief and activity retention system assigned to the nuclear technology plant is designed, in a particularly preferred configuration, for contingent recirculation of the airborne activities or aerosols separated in the scrubbing liquid into the containment. To this end, in a particularly preferred configuration, the container provided with the venturi scrubber is connected via a feedback line to the interior of the containment on the scrubbing liquid side. Using such a configuration, in case of need, i.e. in particular constantly or at cyclic intervals, some or all of the scrubbing liquid laden with activities or aerosols removed from the gas stream may be moved into the containment so that the overall activity requiring treatment remains reliably in the containment. In particular, the scrubbing liquid in the container may in this case be topped up from the further scrubbing liquid reservoir. Such recirculation or feedback of the activities can keep the overall activity quantity and concentration contained in the scrubbing liquid particularly low so that, for example, resuspension effects leading to activity extraction in the downstream filter devices can also be kept particularly low. In particular, this favors comparatively long-term venting operation over several days and weeks, without the subsequent metal fiber filter recleaning device being overloaded by resuspension aerosols and without the iodine separation at the iodine sorption filter being overloaded by iodine resuspension. Precisely by using the venturi tubes, direct gas cooling is achieved for the gas superheated by heat of decay and heat of compression, which allows feedback to the intake side—avoiding further coolers/cooling circuits—and the negative pressure in the container can thus be regulated simply.

A molecular sieve, for example coated with silver nitrate or other silver compounds etc. is preferably provided in a bypass of the main stream—designed for a sub-stream of less than 50% of the design throughput—for effective organoiodine separation in long-term operation of the retention system.

The superheating of the gas stream before entering the molecular sieve may be carried out electrically or by means of a heat exchanger, arranged in the line between the high-pressure fan and the scrubber. This allows passive and straightforward superheating, and the heat of compression introduced can be removed from the process at the relevant parts, so that less scrubbing liquid is evaporated and further component reduction can therefore be carried out.

Continuous decontamination of the influx point of aerosol and iodine activities, and reduction of the heat of compression, can be carried out by spraying process liquid in on the intake side of the high-performance blower. For multiblock plants, for example, this provides the economically very favorable possibility of a central common activity retention device with externalized connecting lines to the various plants, without massive shielding measures being necessary.

Significant improvement of the activity retention and a guarantee of long-term operation can therefore be achieved, particularly in the case of iodine and aerosols. By feeding back or recirculating the activities separated in the venturi scrubber, the heat of decay incurred via the aerosols or airborne activities is furthermore kept away from the container and can be moved back into the containment so that the possible burdens resulting from this in the container, for example due to liquid evaporation, can be kept particularly small. Precisely the avoidance of scrubbing liquid evaporation which can be achieved by this leads overall, i.e. also taking into account possible top ups of scrubbing liquid into the container, to an overall reduced demand for scrubbing liquid.

In order to keep the required number of feed-throughs, which are designed with a view to significant safety requirements, through the containment of the nuclear technology plant particularly small, the feedback line in a further preferred configuration is then connected via the pressure relief line to the interior of the containment. The recirculation or feedback then takes place by jet feeding into the central region of the pressure relief line, so that transfer of the activity-laden scrubbing liquid into the containment can take place in counter flow with the pressure relief gas stream.

The activity-laden scrubbing liquid is preferably sent back continuously or discontinuously via a separate containment feed-through of small diameter, or discontinuously by temporarily generating an increased negative pressure in the containment and briefly interrupting the intake and feedback through the same feed-through by means of jet injection and $c>10$ m/s—with a slow pressure rise—but maintenance of a negative pressure. The negative pressure may in this case be increased cyclically.

In order then to allow feedback in the manner of a fully passive system, the container in a further preferred configuration is geodetically arranged lying at least about 5 m, preferably at least 10 m, higher than the exit point of the pressure relief line from the containment. Feedback of the activity-laden scrubbing liquid through the pressure relief line into the containment is therefore possible merely owing to the geodetic pressure in the water column between the pressure relief line and the container, so that jet feedback can be carried out in counter flow with the gas stream without further active assistance.

Particularly high operational safety can be achieved in that the electrical power supply of the system components of the pressure relief and activity retention system, i.e. in particular the blower device or the controls assigned to it, is constructed independently of the nuclear technology plant so that reliable pressure relief is ensured even in case of incident. In case of need, the blower device may for example be supplied via a nuclear power block not affected by the incident or via a mobile diesel unit with a generator. Particularly favorable flow conditions in the venturi scrubber are ensured in that the blower device is designed to produce a suitably selected pressure gradient, preferably a slight negative pressure of for example less than 5 mbar in the interior of the containment and a positive pressure of about 500 mbar on the pressure side of the blower device.

For particularly reliable activity retention overall, a separator system preferably comprising a centrifugal drop separator and/or a fiber separator, preferably with fibers >50 μm, in particular with decreasing fiber thicknesses, is connected downstream of the venturi scrubber in the pressure relief line. As an alternative or in addition, a metal fiber filter with a fiber thickness of up to 5 μm, preferably of stainless steel fibers or sintered filter fibers with pore or fiber diameters of less than 5 μm, is preferably connected downstream of the venturi scrubber in the pressure relief line. Precisely this ensures that even the minor quantity of fine aerosols <0.5 µm possibly penetrating can still be substantially retained. The filter elements are preferably made of stainless steel fibers. The fine filtering may also be carried out with sintered filter fibers having pore diameters <2 µm.

The scrubbing liquid is preferably designed to a particular degree for effective retention of iodine and iodine compounds. To this end, the container preferably contains a scrubbing liquid with a pH of at least 9, this pH being obtained for example by adding NaOH, other alkalis and/or sodium thiosulfate. The addition of these chemicals to the scrubbing liquid may preferably be carried out by intake via a jet pump lying in a freshwater stream from a separate chemical container in order to set a concentration of from 0.5 to 5 percent by weight in the scrubbing liquid.

Activity reduction and cooling of the reactor core by energy extraction is expediently furthermore simultaneously achieved by an additional direct feed of cold water fully or partially via the retention device into the reactor pressure vessel region, in counter flow with the vent gas, by means of existing systems as simple emergency measures, for example by means of a firefighting pump or via other systems. By high feed quantities with a rising filling level in the containment particularly in the early accident phase, a further advantageous reduction of the vapor-gas mixture to be extracted can thereby be achieved, and therefore also a reduction of the dimensions of the retention device or extraction device.

With respect to the method for pressure relief of a nuclear technology plant of the type mentioned, the object is achieved in that a flow rate of the medium conveyed in the pressure relief line of more than 130 m/s, preferably more than 180 m/s, is applied to the venturi scrubber.

The advantages achieved by the invention are, in particular, that by the deliberate combination of the venturi scrubber with the upstream blower unit and by a suitable design of these components, it is possible to ensure that a particularly high flow rate of the pressure relief gas stream flows through the venturi scrubber essentially throughout the course of an incident. In any event, this ensures a particularly high separating effect of more than 99.5%, preferably >99.9% of the entrained airborne activities or aerosols, in particular also taking into account the fine aerosol fraction with a particle size of <0.5 µm, so that quantitative retention in the liquid phase is achieved and an overall retention effect of from >99.99% to >99.999% is achieved in long-term operation without overloading the downstream metal filter unit, so that release of activities into the environment is avoided particularly reliably.

The pressure relief and activity retention system formed by the venturi scrubber and the upstream blower unit automatically ensures reliable flow through the venturi scrubber in almost all phases of an incident, active atmosphere extraction from the containment also being ensured with a correspondingly high-performance blower unit. Precisely in nuclear technology plants with comparatively high leaks or sealing defects in the containment owing to their design, the blower device can therefore be used in the manner of a twofold function in order to pump off the containment atmosphere gas resulting from serious incidents—while maintaining a negative pressure in the containment—and feeding the activities in the liquid phase back into the containment, so that reliable operation without burdening the environment can be carried out even with such untight containments in case of need.

The method and the devices are preferably used so that the gases or vapors, including their leaks, produced by the residual heat released in accident situations with core meltdown, can be completely extracted and cleaned almost fully with respect to airborne activities before release to the environment. The retained activities are furthermore fed back into the containment in the short term. Owing to the constant volume flow applied to the venturis, the high-pressure blower furthermore achieves a uniformly high venturi velocity without requiring elaborate height staggering of venturi tubes for partial load coverage. The combination of the high-speed venturi scrubber device with feedback, combined with the downstream metal fiber filters, can ensure an overall separation factor of from >99.99% to >99.999% even in long-term operation, independently of the aerosol concentration in the containment.

Other features which are considered as characteristic for the invention are set forth in the appended claims.

Although the invention is illustrated and described herein as embodied in a nuclear technology plant and method for the pressure relief of a nuclear technology plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
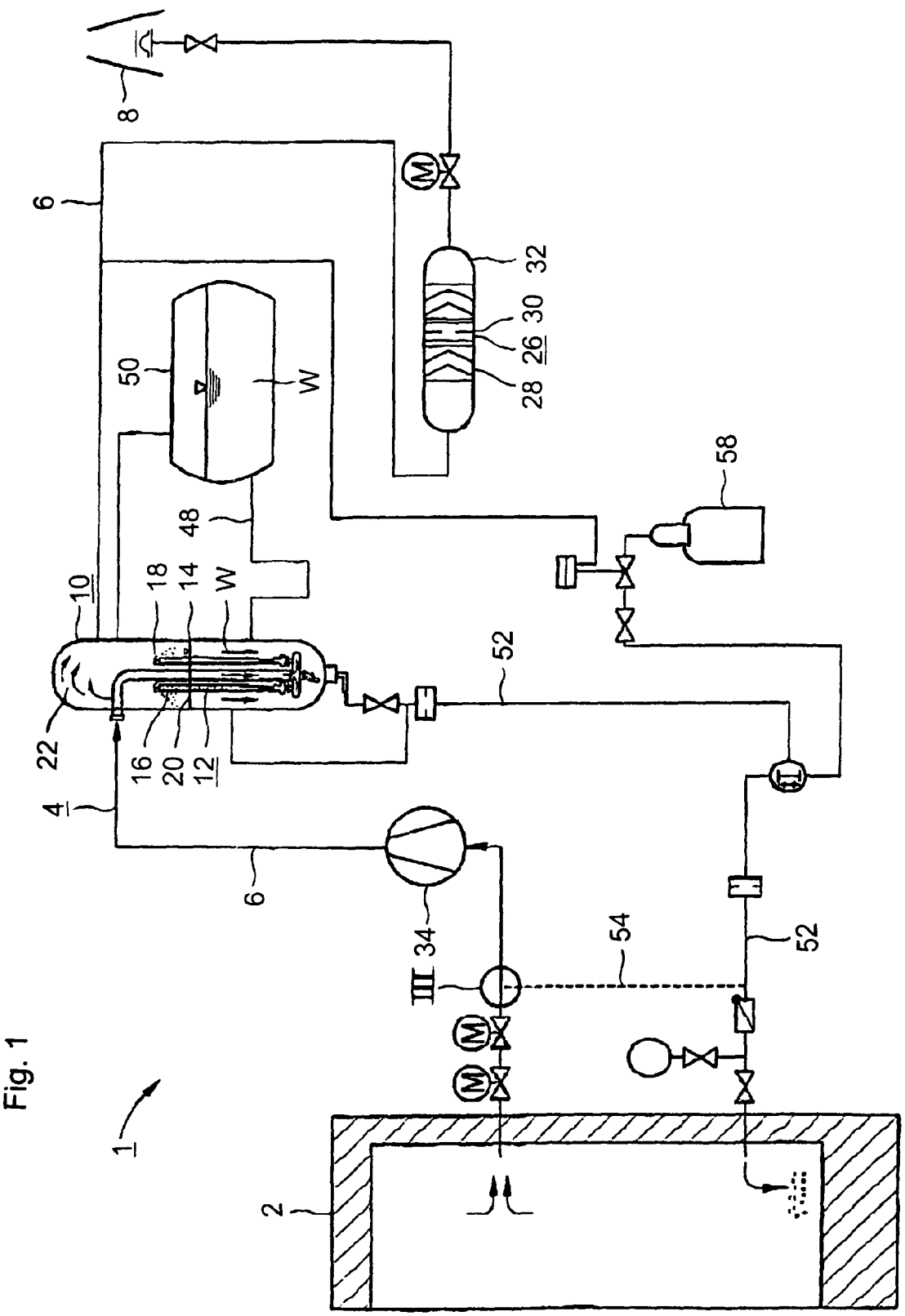
FIG. 1 schematically shows a nuclear technology plant with an assigned pressure relief and activity retention system.

Referring now to the drawing figures in detail and first, particularly, to FIG. 1 thereof, there is shown a nuclear plant 1 (also: nuclear engineering installation, nuclear technology plant) with a containment 2, which contains nuclear components intended for generating electricity and other system components. In order to be able to reliably prevent structural damage or instabilities of the containment 2 even in case of a comparatively serious incident, in which case it is necessary to take into account a strong pressure rise inside the containment 2 due to processes taking place inside the containment 2, the nuclear technology plant 1 is equipped with a pressure relief and activity retention system 4 connected to the containment 2. In case of need, this allows rational and controlled release of the containment atmosphere, also referred to as venting, from the containment 2 into its environment.

The pressure relief and activity retention system 4 comprises a pressure relief line 6, connected to the containment 2, which is connected to a vent 8 on the outlet side. In order to avoid contaminating the environment of the nuclear technology plant 1 in the case of venting or release of the containment atmosphere, the pressure relief and activity retention system 4 is also designed for reliable retention of airborne activities and aerosols contained in the containment atmosphere. To this end, the pressure relief and activity retention system 4 comprises a wet scrubber 10 intended as a filter device for such airborne activities or aerosols.

For its part, the wet scrubber 10 comprises a venturi scrubber 12 which is connected to the pressure relief line 6 and is arranged in a container 14 with a scrubbing liquid W. The venturi scrubber 12 comprises a plurality of venturi tubes 16, which open with their outlets 18 into a gas space 22 lying above the setpoint level 20 of the scrubbing liquid W in the container 14. The gas space 22 is for its part connected on the output side to a further subsection of the pressure relief line 6, which is connected via a filter device 26 to the vent 8. For its part, the filter device 26 comprises a metal fiber filter 28, an intermediate throttle 30 and subsequently a molecular sieve 32. The metal fiber filter 28 is in this case designed particularly as a fine filter with fiber filter mats with a fiber diameter decreasing from 50 μm to approximately 1 μm so that, in particular, even fine aerosols penetrating with a particle size of less than 0.5 μm can be effectively retained.

The pressure relief and activity retention system 4 of the nuclear technology plant 1 is designed for particularly reliable activity retention and, in particular, for a retention factor of 98% or more even for comparatively fine-grained aerosols with a particle size of less than 0.5 μm. To this end, and for reliable active atmosphere extraction from the containment 2 in case of need, a high-power blower device 34, also referred to as a turbo-blower, is connected upstream of the venturi scrubber 12 in the pressure relief line 6. As a design goal, this is based on the pressure relief gas flow flowing through the venturi scrubber 12 with a particularly high flow rate of more than 150 m/s, in particular more than 200 m/s in case of intervention. This is because as it has been found, with such high flow rates it is possible to achieve a virtually immediate rise in the separation rate, even fine and very fine aerosol particles in particular being incorporated into the scrubbing liquid droplets and therefore separated. Suitable selection particularly of the flow cross sections and the power of the blower device 34 in this case ensures that there is such a high flow rate in the venturi scrubber 12 in virtually all the phases of an incident scenario. In order to ensure correspondingly high system leaktightness, for example, the blower shaft feedthrough is additionally designed with a barrier gas seal which is permanently applied.

The effect achieved by this is also that the atmosphere is pumped actively out of the containment 2 through the blower device 34 in case of intervention, so that release of containment atmosphere to the environment is reliably avoided even if there are leaks or sealing defects of the containment 2. For safety reasons, the power supply of the blower device 34 is in this case independent of the nuclear technology plant 1. As an alternative in the case of multiblock plants, a redundant power supply may also be provided for the blower device 34, in which case the blower device 34 can be supplied via a power station block respectively unaffected by the incident in case of need. The power supply is therefore constructed separately, i.e. also independently of the existing switching station and control technology. Another design criterion is furthermore to select the power of the blower device 34 so that, taking into account the gases and vapor quantities produced and their possible sealing defects and leaks incurred during incidents in the core region, a small negative pressure of for example less than 5 mbar in the interior of the containment 2 and a positive pressure of about 500 mbar on the pressure side of the blower device 34 is set up in case of use.

Figure 2:
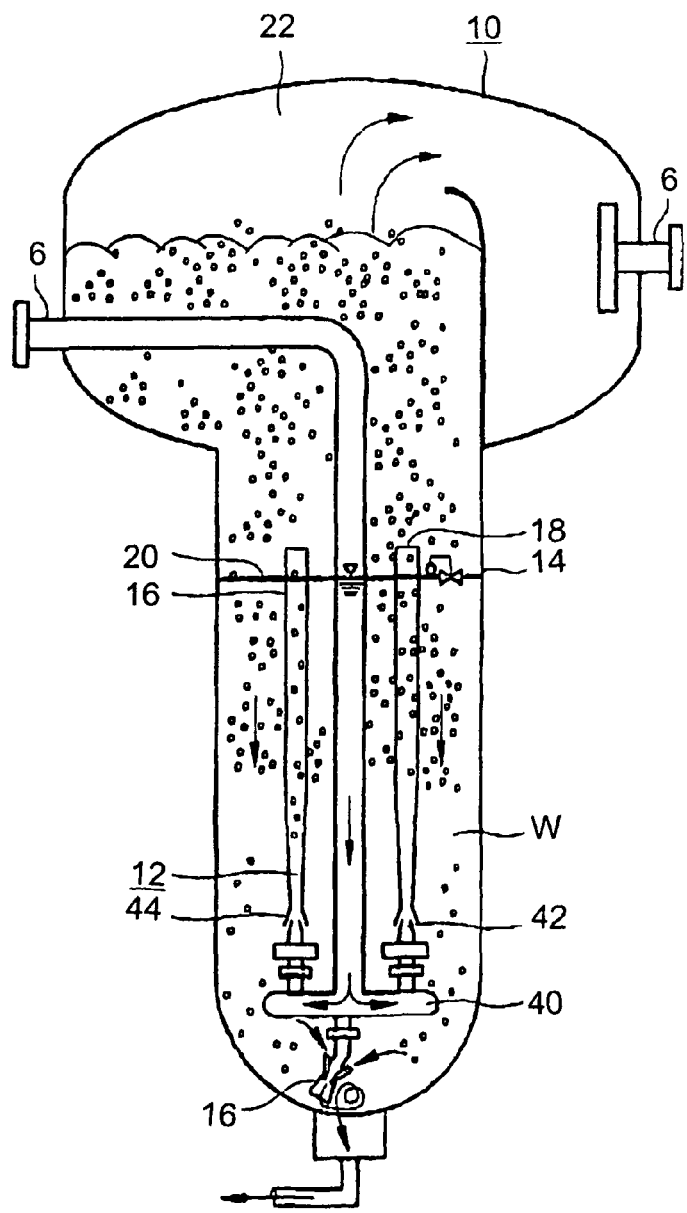
FIG. 2 shows a container with a venturi scrubber.

As can be seen in the enlarged representation according to FIG. 2, the venturi scrubber 12 comprises a multiplicity of venturi tubes 16. The venturi tubes 16 are in this case fed on the gas stream side from a common supply system 40 connected on the input side to the pressure relief line 6. A comparatively large proportion of the venturi tubes 16 are formed as so-called long venturi tubes, which are arranged with their outlets 18 above the intended setpoint level 20 of the scrubbing liquid W and therefore open directly into the gas space 22 in the manner of a "free blowing" arrangement. Provision is furthermore made to prevent contamination or damage of the operating behavior of the venturi scrubber 12 due to accumulation or sedimentation, in that a comparatively small proportion, i.e. less than 10%, of the venturi tubes 16 are directed obliquely downward. This venturi cyclone achieves intense circulation of the scrubbing liquid W inside the container 14, so that sedimentation is reliably prevented.

In particular the venturi tubes 16 designed as long venturi tubes are designed for a comparatively high water load of the gas stream requiring treatment, i.e. more than 5 and in particular more than 10 liters of scrubbing liquid W per cubic meter of gas. To this end, an annular slot feed around the nozzle circumference at an aperture angle of from 30° to 45° is provided in the venturi tubes 16 in the entry region 42 for the scrubbing liquid W. The dimensioning is in this case carried out so that the ratio of the throat cross-sectional area, determined at the constriction 44 or so-called throat of each venturi tube 16, to an entry surface determined at the annular slot feed for the scrubbing liquid W is about 3:1. The constriction 44 is furthermore the point at which the gas stream flowing through has its maximum flow rate; the flow rate to be taken into account for the design and adaptation of the venturi scrubber 12 is consequently also determined at the constriction 44.

In the exemplary embodiment, the venturi tubes 16 designed as long venturi tubes are configured as round venturi tubes with a throat width of less than 40 mm, so that feeding of the scrubbing liquid W as far as the core jet region in the interior of the venturi tube 16 is ensured with passive scrubbing liquid intake and distribution, due to the negative pressure generated by the medium flowing through. The venturi tubes 16 furthermore have a height to throat width ratio of more than 50.

As can furthermore be seen from FIG. 1, multicomponent storage of the scrubbing liquid W is provided in order to allow a particularly compact design of the container 14. On the one hand, the container 14 contains scrubbing liquid W in which the venturi scrubber 12 is arranged. In addition and as a supplement to this, the container 14 is furthermore connected on the scrubbing liquid side via a feed line 48 to a further scrubbing liquid reservoir 50. The scrubbing liquid reservoir 50 may be a vessel specially designed for this, which is chosen to lie at a geodetically suitable height for reliable topping up of scrubbing liquid W into the container 14, in which case the setpoint level 20 of the scrubbing liquid W in the container 14 is adjusted by the height set in the further scrubbing liquid reservoir 50 for the scrubbing liquid W held in it. As an alternative, a water tank which is in any case provided, for example a wastewater container, a deionate supply or the like may also be provided as a further scrubbing liquid reservoir 50, in which case the contingent topping up of scrubbing water W into the container 14 may take place via suitably selected gradients or by, for example, means of diaphragm pumps or compressed air.

The container 14 is furthermore connected on the scrubbing liquid side via a feedback line 52 with throughput limitation and an overflow line to the interior of the containment 2. This makes it possible to feed scrubbing liquid W laden with airborne activities or with aerosols back from the container 14 into the containment 2 in the manner of recirculation or feedback. The activity as a whole can therefore be kept particularly reliably inside the containment 2 by constant or cyclic recirculation of such laden scrubbing liquid W, so that the risk of output into the environment is kept particularly low. Precisely by such recirculation of the scrubbing liquid W, moreover, the heat of decay imported via the retained activities can consequently be moved back from the container 14 into the containment 2, so that the evaporation of scrubbing liquid W in the container 14 is kept particularly low. Despite the recirculation of scrubbing liquid W into the interior of the containment 2 and topping up of scrubbing liquid W from the further scrubbing liquid reservoir 50, the consumption of scrubbing liquid W overall can therefore be kept particularly low because evaporation is avoided.

Figure 3:
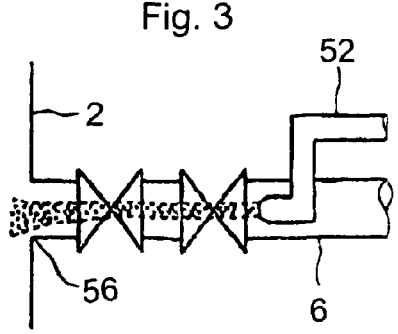
FIG. 3 shows the feed-in point of the plant according to FIG. 1 in detail.

As indicated by the dashed line 54, the feedback line 52 may be connected via the pressure relief line 6 to the interior of the containment 2. As represented in the detail enlargement in FIG. 3, the recirculation is carried out in the manner of a passive configuration in counter flow with the gas stream emerging from the containment 2, no additional feed-through being required through the containment 2. In order to ensure a sufficient feed pressure for the scrubbing liquid W to be fed back, the container 14 in the exemplary embodiment with the scrubbing liquid W contained in it is arranged at a sufficient geodetic height, i.e. about 10 m above the exit point 56 of the pressure relief line 6 from the containment 2. Merely by the geodetic pressure in the water column in the feedback line 52, a sufficient feedback pressure for the scrubbing liquid W into the containment 2 is therefore ensured in the manner of a passive system. As an alternative, cyclic feedback could be provided by closing the outlet valve with a positive pressure in the containment or using a separate small line with a low subcritical cross section and corresponding application of pumps, for example a compressed air diaphragm pump or a rotary pump supplied from a gas store independent of the power supply. The components necessary for this, for example a compressed air reservoir 58 and a diaphragm valve controlled by its own medium, are schematically represented in FIG. 1.

For reliable iodine retention, the pH in the scrubbing liquid W in the container 14 is adjusted to an alkaline value, in particular a value of more than 9. To this end, contingent addition of NaOH, other alkalis and/or sodium thiosulfate at from >0.5 to 5 wt. % is carried out by intake via a jet pump lying in the freshwater stream.

We claim:

1. A nuclear plant, comprising:
a containment;
a pressure relief line communicating with said containment and enabling pressure relief in said containment by blowing off a pressure relief gas;
a blower device and a venturi scrubber connected in series in said pressure relief line, said venturi scrubber being disposed in a container with a scrubbing liquid;
said blower device and said venturi scrubber being dimensioned to establish in said venturi scrubber, in an operating state of said blower device, a flow velocity of the pressure relief gas conveyed in said pressure relief line of more than 130 m/s;
said blower device connected upstream from said venturi scrubber;
said venturi scrubber including a venturi tube configured to be passively fed with a scrubbing liquid due to a negative pressure at the constriction of said venturi tube, and
said venturi tube is formed with an entry region configured to be fed with the scrubbing liquid.

2. The nuclear plant according to claim 1, wherein said blower device and said venturi scrubber are dimensioned to establish a flow velocity of the pressure relief gas of more than 180 m/s in said venturi scrubber.

3. The nuclear plant according to claim 1, wherein said blower device is a radial fan with a rated speed of more than 10,000 rpm and a pressure of at least 200 mbar.

4. The nuclear plant according to claim 3, wherein said blower device is rated for a pressure of more than 500 mbar.

5. The nuclear plant according to claim 1, wherein said venturi scrubber comprises a multiplicity of venturi tubes having outlets, a comparatively large number of said venturi tubes are disposed with the respective said outlets above an intended setpoint level of the scrubbing liquid, and a comparatively small number of said venturi tubes are disposed with an outlet direction directed downward.

6. The nuclear plant according to claim 5, wherein up to approximately 10% of said venturi tubes are disposed with the outlet direction directed downward.

7. The nuclear plant according to claim 1, wherein said venturi scrubber comprises a plurality of venturi tubes having a throat cross-sectional area and an inlet cross-section area for the scrubbing liquid, and a ratio of said throat cross-sectional area to said inlet area is less than 10:1.

8. The nuclear plant according to claim 7, wherein said ratio is approximately 3:1.

9. The nuclear plant according to claim 1, wherein said venturi scrubber comprises a plurality of substantially round venturi tubes with a throat width of less than about 80 mm.

10. The nuclear plant according to claim 9, wherein throat width of said venturi tubes is less than about 40 mm.

11. The nuclear plant according to claim 1, wherein said venturi scrubber comprises a plurality of substantially flat venturi tubes with a throat width of less than about 100 mm.

12. The nuclear plant according to claim 1, wherein said venturi scrubber comprises a plurality of venturi tubes with a height to throat width ratio of more than 20.

13. The nuclear plant according to claim 1, wherein said venturi scrubber comprises a plurality of venturi tubes with a height to throat width ratio of more than 50.

14. The nuclear plant according to claim 1, which further comprises a scrubbing liquid reservoir connected to said container on a scrubbing liquid side thereof.

15. The nuclear plant according to claim 1, which further comprises a feedback line connecting a scrubbing liquid side of said container to an interior of said containment.

16. The nuclear plant according to claim 15, wherein said feedback line is connected via said pressure relief line to the interior of said containment.

17. The nuclear plant according to claim 16, wherein said container is disposed geodetically lying at least approximately 5 m higher than an exit point of said pressure relief line from said containment.

18. The nuclear plant according to claim 17, wherein said container is disposed at least 10 m above said exit point.

19. The nuclear plant according to claim 1, wherein said pressure relief line, said blower device, and said venturi scrubber together form a pressure relief and activity retention system, and wherein an electrical power supply of the system components of said pressure relief and activity retention system, including control systems thereof, is constructed independently of the nuclear plant.

20. The nuclear plant according to claim 1, wherein said blower device is dimensioned so that, taking into account gases and vapor mixtures and leaks produced during incidents in a core region, a negative pressure of less than 5 mbar in an interior of said containment, a positive head pressure of approximately 500 mbar on a pressure side of said blower device is established during operation of said blower device.

21. The nuclear plant according to claim 1, which further comprises at least one of a centrifugal drop separator and a fiber separator connected in said pressure relief line downstream of said venturi scrubber.

22. The nuclear plant according to claim 21, wherein said fiber separator has fibers with a thickness of more than 50 μm.

23. The nuclear plant according to claim 21, wherein said fiber separator has fibers with decreasing fiber thickness.

24. The nuclear plant according to claim 1, which further comprises a metal fiber filter with a fiber thickness of up to 5 μm connected in said pressure relief line downstream of said venturi scrubber.

25. The nuclear plant according to claim 24, wherein said metal fiber filter has stainless steel fibers or sintered filter fibers with pore or fiber diameters of less than 5 μm.

26. The nuclear plant according to claim 1, wherein the scrubbing liquid in said container has a pH of at least 9.

27. A method for relieving pressure in the nuclear plant according to claim 1, which comprises:
- subjecting the venturi scrubber to a flow velocity of the pressure relief gas conveyed in said pressure relief line of more than 130 m/s; and
- connecting said blower device upstream from said venturi scrubber.

28. The method according to claim 27, which comprises setting the flow velocity to more than 180 m/s.

29. The nuclear plant according to claim 1, wherein: said venturi tube has at least one feature selected from the group consisting of: a nozzle with a nozzle circumference and an annular slot feed around said nozzle circumference, a throat width of less than 80 mm, a flat construction with a throat width of less than 100 mm, a height to throat width ratio of more than 20.

* * * * *